May 11, 1954  W. DILLINGHAM ET AL  2,678,143
STACKABLE JELLY MOLD
Filed Nov. 24, 1952

WILLIAM DILLINGHAM
ETHEL DILLINGHAM
INVENTORS

BY Hazard & Miller
ATTORNEYS

Patented May 11, 1954

2,678,143

UNITED STATES PATENT OFFICE 2,678,143

STACKABLE JELLY MOLD

William Dillingham and Ethel Dillingham,
Los Angeles, Calif.

Application November 24, 1952, Serial No. 322,190

1 Claim. (Cl. 220—97)

This invention relates to a mold for jellies and gelatin-type desserts such as "Jello" and the like.

In the formation or production of gelatin-type desserts and similar comestibles, the customary procedure is to pour the composition of the dessert while in a heated and highly fluid condition into individual molds in which the composition is allowed to cool and to congeal or solidify. Such individual molds are frequently placed in a refrigerator to hasten their cooling and congelation. Where there are a number of individual molds these have heretofore been placed in side by side relationship on the refrigerator shelf and unnecessarily occupy a large amount of shelf space.

An object of the present invention is to provide an improved mold for this purpose wherein a plurality of the molds may be stacked one above the other so that the shelf space of but a single mold is required.

More specifically an object of the invention is to provide a mold for gelatin-type desserts and the like consisting of an open-topped pan having an upstanding hollow central portion in the bottom thereof which extends above the rim of the pan and which has a reduced upper end terminating at its base in a shoulder. This reduced upper end is capable of being received telescopically in the bottom of the upstanding portion of a duplicate pan with the bottom of the duplicate pan resting on the shoulder so that the duplicate pan will be supported in stacked relation with its bottom disposed in spaced relation to the rim of the mentioned pan. In this manner cool air in the refrigerator may freely circulate between the bottom of a stacked pan and the contents of the subjacent pan, facilitating the cooling.

A further object of the invention is to provide a mold of this character which can be very easily and economically manufactured and which is so designed that it may be easily maintained in a clean and sanitary condition.

With the foregoing and other objects in view, which will be made manifest in the following detailed description and specifically pointed out in the appended claim, reference is had to the accompanying drawings for an illustrative embodiment of the invention, wherein:

Figure 3:
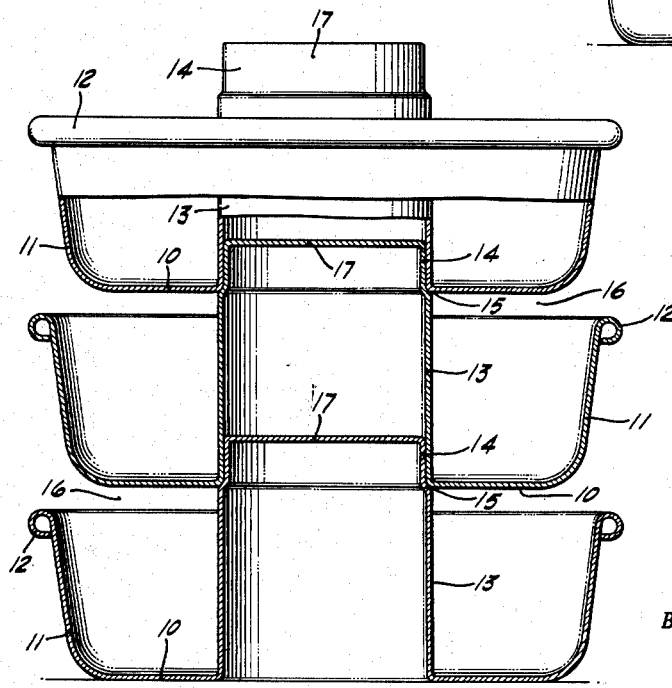
Fig. 3 is a partial view in vertical section taken substantially upon the line 3—3 upon Fig. 1.

Referring to the accompanying drawings wherein similar reference characters designate similar parts throughout, the mold embodying the present invention consists of an open-topped pan having a bottom 10, side walls 11, and a rim 12. For simplicity purposes the mold is preferably in the form of a circular pan although the shape of the mold may be varied if desired. At approximately the center of the bottom 10 there is an upstanding hollow central portion 13. This central portion is preferably substantially cylindrical and has its upper end 14 of reduced diameter. The reduction in diameter of the portion 14, which is likewise substantially cylindrical, is approximately equal to the thickness of the metal of the upstanding central portion so that the reduced portion 14 is capable of telescoping into the base of the upstanding portion 13 of a duplicate pan, as illustrated in Fig. 3, with a snug fit.

The portion 14 is defined from the remainder of the upstanding portion 13 by a shoulder 15 engageable by the bottom of a duplicate pan so that the bottom of the duplicate pan will be supported at an elevation in spaced relation to and above the rim 12 of the subjacent pan. In this manner there is left a relatively wide opening indicated at 16 between each mold and the subjacent mold through which air can readily circulate. While the molds embodying the present invention may be produced by spinning sheet metal, they are preferably produced by being drawn from sheet metal. The top of the central portion 13 is preferably closed, as indicated at 17, although this closure is not essential.

Figure 1:
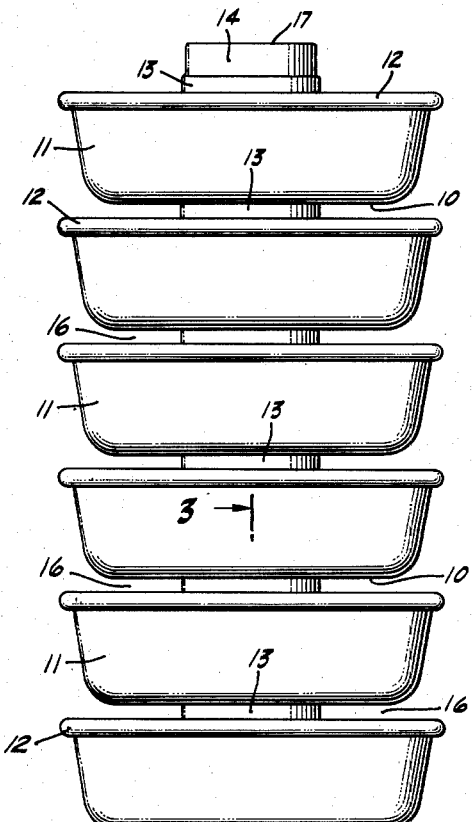
Figure 1 is a view in side elevation of a plurality of stacked molds embodying the present invention.

In using the mold embodying the present invention a plurality of individual molds may be filled with a comestible which congeals or solidifies on cooling. The molds are filled while the comestible is in a fluid condition. When the molds have been filled they are stacked one above the other, as shown in Fig. 1. Due to the relatively snug fit between the reduced portion 14 of each mold and the upstanding hollow central portion 13 of the mold next above, a number of the molds may be stacked on each other without danger of any mold tipping or sliding off of the stack. The entire stack of filled molds may then be positioned in the refrigerator for cooling and congealing the contents thereof and when so positioned the stack occupies the shelf room of but a single mold. The molds may be emptied in the conventional manner and, as will be observed from the formation of the mold, there is no portion thereof that resists or retards the emptying of the congealed contents. It will be appreciated by those skilled in the art that the mold is so shaped and so designed that all surfaces are readily accessible so that washing and cleaning is facilitated.

Figure 2:
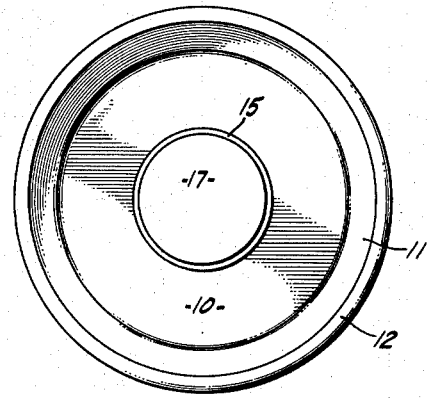
Fig. 2 is a top plan view of one of the molds.
Figure 4:
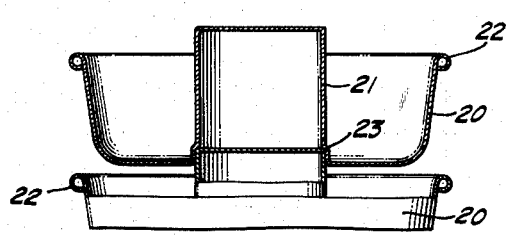
Fig. 4 is a sectional view illustrating a modification.

In Fig. 4 there is disclosed a slight modification wherein the pan 20 has an upstanding central portion 21 which extends upwardly above the rim 22. In this form of construction the major portion of the upstanding central portion is of reduced diameter defined from the base portion by means of a shoulder 23. In this form of construction the shoulder 23, which may be regarded as an internal shoulder on the upstanding central portion, engages the top of the upstanding central portion of a subjacent pan so as to support the bottom of the mentioned pan above the contents of the subjacent pan. The upper reduced portion of the upstanding central portion of the pan fits rather closely in the upstanding portion of a superposed pan beneath the shoulder 23 so that when the pans are stacked they will not tip or tilt relatively to each other. In effect, the two constructions disclosed are substantially the same in that in both the reduced upper end of the upstanding central portion telescopically fits into the upstanding central portion of a superposed pan. In the form illustrated in Figs. 1 to 3, inclusive, there is an external shoulder on the upstanding central portion which limits the downward telescopic movement. In the form shown in Fig. 4, there is an internal shoulder which performs the same function. In both constructions the shoulders are so arranged as not to interfere with easy cleaning.

From the above described construction it will be appreciated that the improved mold may be easily and economically manufactured and possesses a number of meritorious qualities.

Various changes may be made in the details of construction without departing from the spirit and scope of the invention as defined by the appended claim.

We claim:

A device of a class comprising an open-topped pan having an upstanding hollow center portion opening outwardly through the bottom thereof, said hollow center portion extending above the rim of the pan and being slightly smaller than the internal diameter of the base of the hollow center portion so as to be capable of being telescopically received in the base of the hollow center portion of a duplicate pan, the upper end of the hollow center portion being defined from the remainder thereof by a shoulder the diameter of which is greater than the diameter of the hollow center portion thereabove, and which is so located as to limit the telescoping movement of the hollow center portion of the pan relative to that of its duplicate to a position wherein the rim of the pan is in downwardly spaced relation to the bottom of a superposed duplicate pan positioned thereon.

References Cited in the file of this patent

UNITED STATES PATENTS

| Number | Name | Date |
| --- | --- | --- |
| 1,509,524 | Morrison | Sept. 23, 1924 |
| 2,135,342 | Jackson | Nov. 1, 1938 |
| 2,602,568 | Kinney | July 8, 1952 |

FOREIGN PATENTS

| Number | Country | Date |
| --- | --- | --- |
| 543,014 | Great Britain | Feb. 5, 1942 |